March 5, 1968   G. A. BLEYLE, JR., ET AL   3,371,946
CRYOGENIC COUPLING

Filed Nov. 2, 1965   2 Sheets-Sheet 1

GUSTAVE A. BLEYLE JR.
ARTHUR SULLIVAN
ROSS D. RANDALL
HENRY W. BOGER
*INVENTORS*

March 5, 1968 G. A. BLEYLE, JR., ET AL 3,371,946
CRYOGENIC COUPLING

Filed Nov. 2, 1965 2 Sheets-Sheet 2

GUSTAVE A. BLEYLE JR.
ARTHUR SULLIVAN
ROSS D. RANDALL
HENRY W. BOGER
*INVENTORS*

BY Daniel H. Bobis
*Atty*

United States Patent Office 3,371,946
Patented Mar. 5, 1968

3,371,946
CRYOGENIC COUPLING
Gustave A. Bleyle, Jr., 6 Russet Lane, Lynnfield, Mass. 01940; Arthur Sullivan, 15317 DePauw St., Pacific Palisades, Calif. 90272; Ross D. Randall, Pukham Hill Road, Sherborn, Mass. 01770; and Henry W. Boger, 67 Woodland Road, Westwood, Mass. 02090
Filed Nov. 2, 1965, Ser. No. 506,029
11 Claims. (Cl. 285—47)

ABSTRACT OF THE DISCLOSURE

A cryogenic coupling for double-walled vacuum insulated cryogenic conduits in which the inner seal for the inner conduit includes a spacing ring thicker than the outer seal spacing ring to prestress a bellows member operative to mechanically space the inner conduit from the outer conduit. The inner seal is a one-way seal, acting against pressures within the inner conduit, and will allow pressure built up in the space between mated coupling members (each having a bellows member) to be released into the inner conduit. Additionally, an annular seal spacer is designed to be placed on one of the mating coupling members to hold the spacer in place while mating the couplings. Further, an insulating member conforming to the contour of the opposed bellows members forming the mating coupling members is utilized, which insulating member is a one piece unitary fiberglass insulator having its fibers oriented circumferentially with respect to the axis of the coupling and which is coated with a porous material to allow gases to pass through the insulator and thus allow gases into the spaces between the interstices of the glass fibers.

In general, this invention relates to a coupling for transfer lines for cryogenic fluids, and more particularly to a new and improved coupling for use with such transfer lines.

There has recently been developed a new coupling device for vacuum-insulated cryogenic conduits which provides the combination of low heat leak and single plane assembly through the use of a novel double-seal and insulation space arrangement. This coupling has utilized mating halves which are interchangeable with each half emphasizing ruggedness, simplicity, ease of maintenance and reliability. That is, each half consisted of an inverted bellows member operating as a low heat conductive path between the inner and outer conduits. It will be understood that between the inner and outer conduits, there has been provided a vacuum space for insuring heat insulation between the conduits. The bellows member was intended to provide the minimum amount of heat conductivity between the inner and outer conduits while still maintaining mechanical coupling between the two conduits and, further, forming a major portion of a coupling for connecting one double-walled conduit to another similar double-walled conduit.

The coupling used heretofore has encountered certain problems which are overcome by the teachings of the present invention. That is, there are, by necessity, some gases in the space between abutting mating-halves, which gases tended to transfer heat through the coupling by convection from the inner conduit to the outer conduit, thus limiting the effectiveness of the coupling.

Further, the use of an inner seal, was found to be ineffective because the inner conduit when used in a cryogenic line was subjected to extremely cold conditions. When this occurred, the seal between the adjacent inner conduits would shrink causing the seal to pull away from the inner conduit flanges and the seal would be broken.

Thus, it is the general object of this invention to avoid and overcome the foregoing difficulties and other problems of the prior art practices by the provision of a new and better cryogenic coupling.

A further object of this invention is the provision of a new and better cryogenic coupling for double-walled vacuum conduits having an inner seal between abutting ends of coupled inner conduits, which inner seal will not open when the inner conduit is subjected to extremely cold temperature conditions.

A still further object of this invention is a provision of a new and better cryogenic coupling for double-walled vacuum insulated cryogenic lines which will prevent pressure buildup between mating couplings.

Another object of this invention is the provision of a new and better coupling for vacuum-insulated cryogenic lines in which heat loss is kept to a minimum.

Still another object of this invention is the provision of a new and better coupling for vacuum insulated cryogenic lines in which an insulator is used for reducing convection losses between mating coupling members, which insulator will not contaminate or react with the fluid passing through the cryogenic line.

Other objects will appear hereinafter.

Summary of the invention

The purposes of the present invention are achieved by providing an inner seal for mating halves of a cryogenic coupling, which inner seal includes a spacing ring thicker than the outer seal spacing ring to prestress the bellows member. The inner seal is further operative to act as a seal only from pressures within the conduit and will allow pressure built up in the space between the mating couplings to be released into the inner conduit. The prestressing of the bellows member is operative to allow for the shrinkage of the bellows member under the extreme cold conditions prevalent therein. Since the outer conduit is not subjected to the same extreme temperature conditions, the inner portion of the bellows member must be compressed to a greater extent to maintain constant sealing of the coupled inner conduits over a wide range of temperature conditions. This prestress maintains the inner seal spacing ring in sealing engagement with the inner conduit flanges. The inner seal would not otherwise be operative as the seal loses its elastic qualities under the operating cryogenic temperature conditions.

It will be understood that the inner seal is provided to keep the liquid within the inner conduit from entering the annular space between opposed mating coupling halves. If the liquid were to enter the annular space, then the outer conduit would be cooled to cryogenic temperature and a large amount of heat would be absorbed from the atmosphere. This circumstance would cause the coupling to fail in its intended purpose, i.e., limiting heat inflow into the system. In normal operation, the annular space is pressurized with gas to the same pressure that exists in the inner conduit. The inner seal, therefore, is required only to seal against the hydrostatic head of the fluid resulting from the liquid column within the annular space, which column can be, at a maximum, equal to the diameter of the line. As was stated previously, the one way type seal serves to prevent excess pressure from building up in the annular space. The inner seal, being a one way seal, effectively seals the annular space from liquids in the inner conduit, but will allow flow from the annular space back to the inner conduit. Thus, any gas pressures within the annular space will increase only to the point that the inner seal collapses and allows the gases to leave the annular space and enter the inner conduit.

An additional feature of the inner seal of the present invention is its utilization of the said annular seal spacer which is dsigned to be placed on one of the mating coupling halves to hold the spacer in place during joining of the coupling. In this way, the inner seal will not drop during assembly and will mate properly with the other half of the coupling.

One of the solutions suggested for eliminating convection losses between the couplings was to place an insulating member conforming to the contour of the opposed bellows members forming the mating coupling halves to prevent the circulation of gases and cut down on convection losses. However, since the solid insulator could not be as nonconductive as its gaseous counterpart, the use of solid insulators increased the conductivity between adjacent surfaces of the bellows members and the striking of a balance between convection losses and conduction increases had to be made by the designers of the coupling.

Thus the present invention utilizes an insulator between mating halves of the coupling which will prevent convection losses. The insulator satisfies the requirements of low thermal conductivity, chemical insensitivity to oxygen, and freedom from any tendency to shred or fragment and thereby introduce particulate contamination into the line or associated equipment. Various materials were tested which appeared to have properties which would perform the functions desired. That is, tests were conducted with polyurethane, sintered Teflon (5 micron hole size) and silicone-bonded fiberglass. The fiberglass displayed a marked superiority to the other materials tested. Initially, stacked discs of .080 inch thick fiberglass were used. However, an appreciable improvement in the thermal performance was observed with the substitution of special fiberglass insulators molded to fit the coupling.

These special fiberglass insulators are composed of glass fibers (.0003–.0005 inch in diameter) bound with a silicone-resin system. The fibers are generally oriented in a circumferential manner with respect to the axis to reduce heat transfer. The nominal density of the molded insulator was eight pounds per cubic foot which was the optimum value for insulation purposes indicated by extensive tests. The volatiles contained in this silicone resin were removed to increase the compatibility of the material with liquid oxygen. The insulator is coated with Teflon .001–.002 inch thick. This surface coating of Teflon prevents loose fibers from shredding or fragmenting and thus contaminating the line or system. The Teflon coating is also porous and allows gases to pass therethrough to allow air into the spaces between the fibers.

Each of the fibers insures that there will be large numbers of air spaces which effectively increase the heat insulating properties of the insulator. Further, the circumferential alignment of the fibers limits conductivity between the inner and outer conduits. For all these reasons, the insulator is extremely effective in achieving its desired purposes.

For the purpose of illustrating the invention, there is shown in the drawings a form which is presently preferred; it being undestood, however, that this invention is not limited to the precise arrangements and instrumentalities shown.

Figure 1:
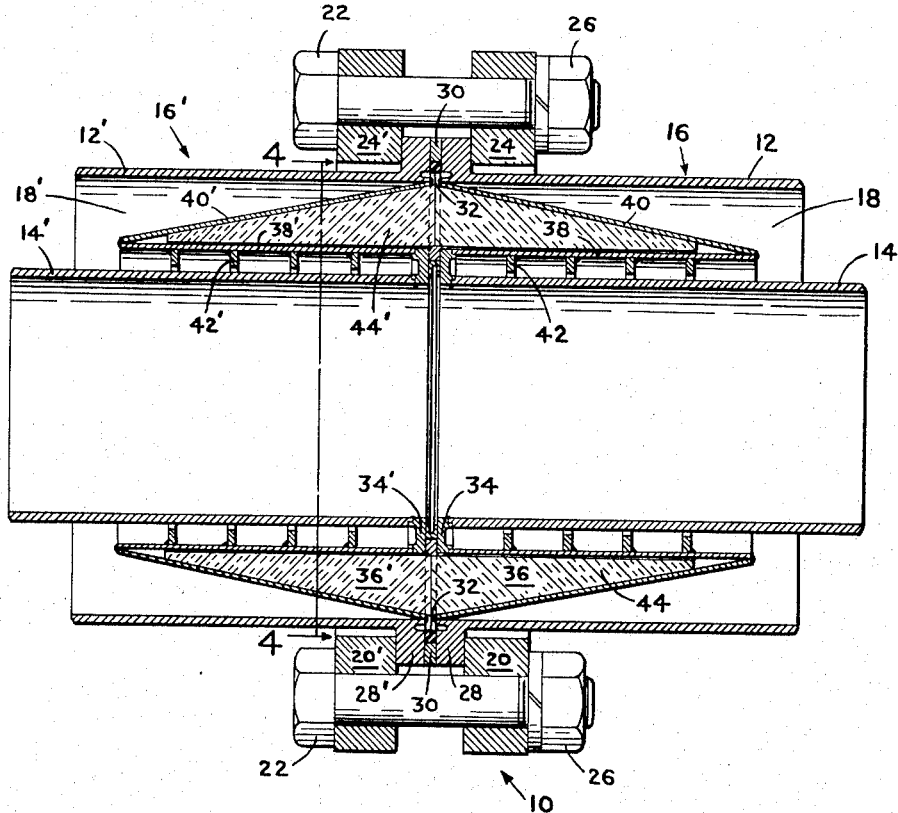
FIGURE 1 is a cross-sectional view of a coupling for a vacuum insulated cryogenic line built in accordance with the principles of the present invention.
Figure 4:
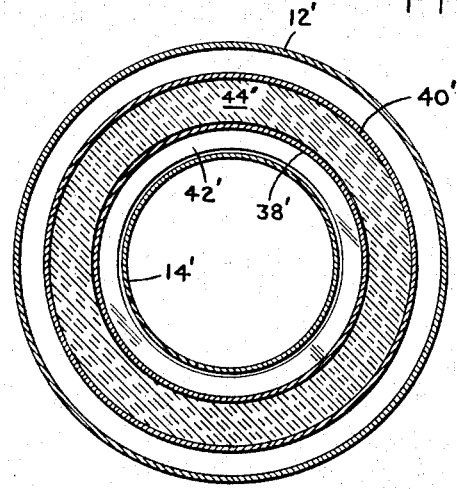
FIGURE 4 is a cross-sectional view of the coupling of FIGURE 1 taken along lines 4—4.

In FIGURE 1, there is shown the cryogenic coupling of the present invention, generally designated by the numeral 10. the coupling 10 is utilized for supporting and sealing an outer conduit 12 and an inner conduit 14 of a first cryogenic line 16 to the outer conduit 12' and inner conduit 14' of a second cryogenic line 16'. The annular space 18 between conduits 12 and 14 and the annular space 18' between conduits 12' and 14' is normally evacuated.

The coupling 10 comprises two mating halves 20 and 20' associated respectively with lines 16 and 16' for (a) sealing the evacuated spaces 18 and 18' at the ends thereof, (b) for structurally separating conduits 12 and 14 and 12' and 14' respectively and (c) for limiting heat transfer between the atmosphere and inner conduits 14 and 14'.

Mating half 20 of coupling 10 is identical to mating half 20' and, therefore, it will be understood that a part of mating half 20 will have its identical counterpart in mating half 20' designated by a similar prime numeral.

The mating halves 20, 20' are held together by bolts 22 which pass through coupling flanges 24 and 24' and are in screw threaded engagement with nuts 26. Coupling flanges 24 and 24' are annular collars abutting the outer surfaces of outer conduit sealing flanges 28 and 28'. Sealing flanges 28 and 28' are respectively connected to, or, in the alternative, could be integral with, the outer conduits 12 and 12'. Between the faces of sealing flanges 28 and 28' are positioned a solid O-ring spacer 30 and O-ring seal 32. The O-ring seal 32 acts in sealing the outer conduits 12 and 12' to prevent gases trapped between the mating coupling halves from passing between the flanges 28 and 28' and the O-ring spacer 30. The inner conduits 14 and 14' have respective inner sealing flanges 34 and 34' which extend outwardly into T spaces 18 and 18'. The sealing flanges 34 or 34' are connected to the outer flanges 28 and 28' respectively by annular bellows members 36 and 36'. These bellows members 36 and 36' are formed of a pair of hollow annular rigid elongated members 38, 40, and 38', 40'. Elongated member 38 is sealably connected, as by welding, at one end to the top edge of inner flange 34 and along its other end to elongated member 40. The elongated member 38 is cylindrical in shape and co-axial with the inner and outer conduits 12 and 14 and has an axial length approximately equal to the diameter of inner conduit 14.

Hollow annular rigid elongated member 40 is frustoconical in shape, is co-axial with rigid elongated member 38, and has its large diameter ends sealably connected as by welding to the outer flange 28.

Bellows member 36' is identical in construction to bellows member 36.

The cylindrically elongated member 38 is re-enforced by spaced parallel rings 42 welded to the surface of member 38 opposite from inner conduit 14. Rings 42 are spaced from the inner conduit 14 so as to prevent any heat conduction between the rings 42 and the conduit 14.

Within the bellows member 36 there is placed an annular insulating member 44. Insulating member 44 conforms to the inner surface of the bellows 36 and is adapted to abut an annular insulating member 44' in bellows 36'. The insulating members 44 and 44' have to fulfill the requirements of low thermal conductivity, chemical insensitivity to oxygen, and freedom from any tendency to shred or fragment and thereby introduce particulate contamination into the inner conduit 14. The insulating members 44 and 44' are formed of glass fibers .0003–.0005 inch in diameter bound with a silicone-resin system. The glass fibers are oriented in a circumferential manner with respect to the axis of the annular insulator to reduce heat transfer. The nominal density of the molded insulating members 44, 44' is eight pounds per cubic foot. The volatiles contained in the silicone resin are removed to increase the campatibility of the material with liquid oxygen. The insulating member is coated with Teflon (E. I. DuPont's trademark for polytetrafluoroethylene) .001 to .002 inch thick. This surface coating of Teflon prevents loose fibers from shredding or fragmenting and thus contaminating the line or system. Teflon further has the advantage that it is porous and, therefore, gases can pass through the insulating member and, accordingly, between the glass fibers to optimize the non-conductive properties of the insulator. Of course, the insulator itself acts as an anti-convection member. The porosity of the coating further allows the insulator to be pressurized and depressurized without being distorted or the coating split as would be the case if the coating were non-porous.

Between the faces of the inner conduit flanges 34 and 34' there is placed a lip seal ring spacer 46 which is annular in shape and has an outer diameter slightly greater than the diameter of the cylindrical elongated member 38. The spacer 46 is slightly thicker than the spacer 30. The lip seal ring spacer 46 has an axially extending lip 48 that fits over the edge of flange 34. The lip 48 enables the inner spacer 46 to be held in place during the time mating halves of the coupling are connected. The lip seal ring spacer 46 has a uniform thickness over the portion that is to be placed between the flanges 34 and 34'. The inner diameter surface 50 of the lip seal ring spacer 46 is adapted to be flush with, and equal in width to, the outer diameter surface of a lip seal ring 52 which acts as an inner seal between conduits 14 and 14'. The lip seal ring 52 comprises an inner spring member 54 bowed in a manner whereby its open ends face inwardly into the conduit 14. The bowed member 54 is positioned with a Teflon member 56. The outer surface of the member 56 has a width equal to the inner diameter 50 of spacer 46.

Spacer 46 is designed to be of such thickness that tightening of nuts 26 on bolts 22 will cause a precompression of rigid elongated members 38 and 38' and a pretensioning of rigid elongated members 40 and 40'. This prestressing of the bellows members 36 and 36' is designed to be approximately equal to the expected thermal distortion of bellows members 38 and 38' so that the spacer 46 will be forcibly held between flanges 34 and 34' under all operating conditions. This is necessary because at cryogenic temperatures the lip seal is not flexible, and would not follow dimensional changes without introducing the possibility of leakage. The lip seal ring 52 has annular sealing legs 58 and 60 formed of the inner spring member 54 and the Teflon member 56 on the outer surface thereof, to seal against the facing surfaces of flanges 34' and 34 respectively.

Figures 2, 3:
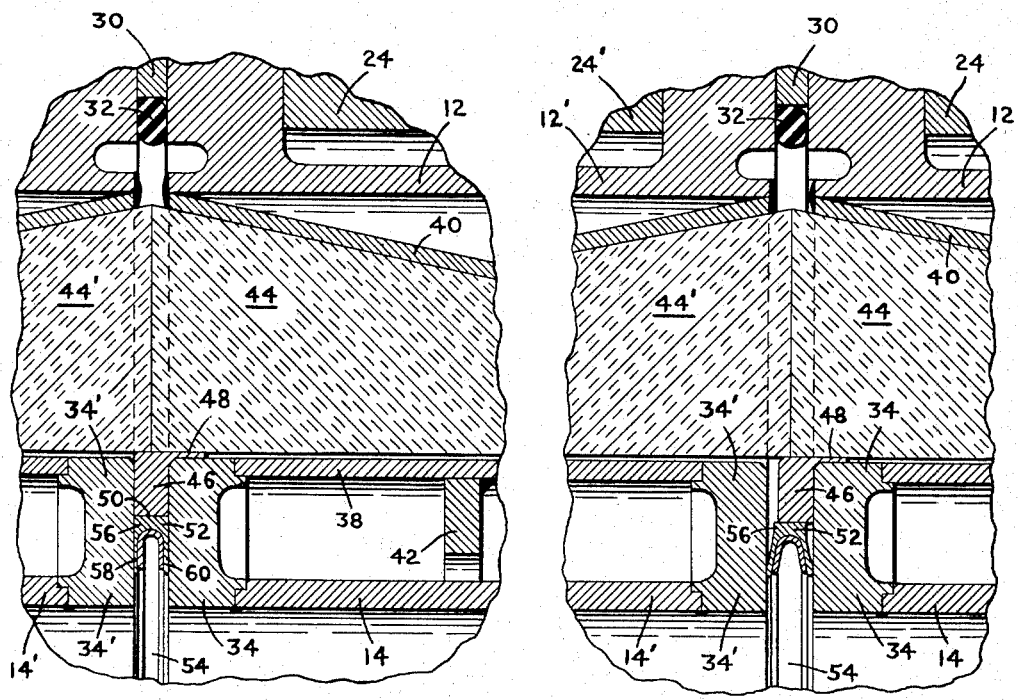
FIGURE 2 is a partial cross-sectional view of the inner seal of the coupling of FIGURE 1 before fluid is passed through the inner conduit.
FIGURE 3 is a partial cross-sectional view similar to FIGURE 2 showing the inner seal of the coupling where there was no precompression of the coupling and cold fluid has passed through the inner conduit.

As shown in FIGURE 3, during use, if there were no prestressing of bellows member 36 and 36' the extreme cold of the fluids passing through conduits 14 and 14' would cause flanges 34' and 34 to pull away from contact with lip seal ring spacer 46. With the prestressing of the bellows members 36 and 36', the flanges 34 and 34' will remain in contact with lip seal ring spacer 46 as shown in FIGURE 2. Of course, the Teflon member 56 insures the desired sealing engagement between the legs 58 and 60 and the surfaces of flanges 34 and 34'.

The spacer 46 is designed with a thickness greater than spacer 30 so as to provide a prestressing of bellows members 36 and 36' an amount dependent on the difference in the expected contraction of rigid elongated members 40 and 40' with respect to the expected contraction of rigid elongated members 38 and 38', it being understood that the average expected temperature, during operation, of members 38 and 38' is lower than that of members 40 and 40'.

It will be noted that the spring member 54 is bowed inwardly so that if excess pressures build up within the conduit 14, the seal is strengthened as the pressure will force the legs 58 and 60 into greater engagement with the facing surfaces of flanges 34 and 34'. Accordingly, none of the fluid in the conduits 14 and 14' can enter into the space between the mating coupling halves 20 and 20'.

However, should the pressure of gases between the mating coupling halves increase so as to exceed a given value, these gases will pass into the conduits 14 and 14' by forcing the legs of 58 and 60 inwardly to break the seal between the legs and the facing surfaces of flanges 34 and 34'. This is the advantage of utilizing a lip seal ring 52 which acts as a oneway sealing member, i.e., allowing gases to leave the space between mating coupling halves and enter into the inner conduit 14 and 14', while preventing gases from leaving the conduits 14 and 14' and entering into the space between the mating coupling halves.

It should be noted that the lip seal ring 52 is required only to seal against a hydrostatic head having a height equal to the diameter of the line.

Further, by utilizing the lip seal ring spacer 46 with a lip 48 for holding it in place, the lip seal ring 52 can also be held in place during the coupling of the two mating halves by merely positioning the lip seal ring within the lip seal ring spacer 46.

The lip seal ring spacer 46 also serves to support the lip seal ring 52 against line pressure during the interval between pressurization of the inner line and rise of pressure in the annular space 44, 44'.

The present invention may be embodied in other specific forms without departing from the spirit or essential attributes thereof and, accordingly, reference should be made to the appended claims rather than to the foregoing specification as indicating the scope of the invention.

We claim:

1. A cryogenic coupling for connecting two conduits to each other, each of said conduits having an inner hollow pipe for conveying a fluid and an outer hollow pipe surrounding said inner pipe and spaced therefrom for defining an evacuated space therebetween, said inner and outer hollow pipes each having one end positioned adjacent one another approximately in a common plane, said coupling comprising:
   (a) two mating halves each having:
      (1) annular flange means sealably mounted on said outer pipe adjacent said one end thereof;
      (2) means for sealing said one ends of said inner and outer pipes together, said sealing means including inner and outer annular members coaxial with said pipes, said inner member being sealably connected so said inner pipe adjacent said one end thereof, said outer member being sealably connected to said flange means, said inner and outer members extending into said evacuated space spaced from said inner and outer pipes respectively, said inner and outer members intersecting along an annular line between said inner and outer conduits within said evacuated space,
   (b) flange closure means for sealing said flanges to each other; and
   (c) a rigid inner seal member positioned between said one ends of said inner pipes, said inner seal member including an inner seal spacing ring of sufficient thickness to separate said one end of said inner pipes by a distance greater than the distance between said annular flanges under ambient conditions prior to operation of said flange closure means, so as to cause said spacing ring to prestress said inner and outer members under ambient temperature conditions an amount sufficient to maintain sealing engagement of said inner seal spacing ring with said one ends of said inner pipes when low temperature fluids are passed through said inner pipes, whereby, during operation, said inner seal member will maintain sealing conditions between one ends of said inner pipes so as to prevent fluids from passing from said inner pipes into the space between opposed mating halves of the coupling.

2. A coupling of claim 1 wherein said inner seal member is one-way operative to prevent fluids from passing from said inner pipes into the space between mating coupling halves and allowing gases whose pressures exceed a given value to pass from the space between opposed mating halves into said inner pipes.

3. The coupling of claim 1 wherein said inner seal spacing ring includes holding means, said holding means being operative to hold said inner seal spacing ring in place during connection of said mating halves, said inner seal member including an inner seal ring having an outer surface conforming to the inner surface of said inner seal spacing ring whereby said inner seal ring will be held in place by said inner seal spacing ring during connection of said mating halves.

4. The connection means of claim 3 wherein said inner seal ring outer surface has a thickness equal to the thickness of said inner seal spacing ring inner surface, said inner seal ring including a bowed annular spring member having its open end facing into said inner pipes whereby pressures within said inner pipes will increase the sealing between opposed one ends of said inner pipes.

5. The coupling of claim 3 wherein said holding means includes an annular lip adapted to be supported on one of said mating halves.

6. The cryogenic coupling of claim 1 including an annular solid heat insulating member formed of heat insulating fibers bonded together with spaces between adjacent fibers to increase the heat insulating properties of the annular solid, heat insulating member, the latter conforming in shape to the space between said inner and outer annular members, and a coating on said solid annular heat insulating member, said coating being formed of a porous non-fibrous material so as to prevent particulate contamination while allowing gases to pass between fibers forming said member.

7. The cryogenic coupling of claim 6 wherein said heat insulating fibers are glass and said fibers are bonded together with a silicone-resin system.

8. The cryogenic coupling of claim 7 wherein said coating is polytetrafluoroethylene.

9. The insulator for one mating half of a coupling for two conduits each comprising an inner hollow pipe for conveying a fluid and an outer hollow pipe surrounding said inner pipe and spaced therefrom for defining an evacuated space therebetween, respective one ends of each of said inner and outer pipes positioned adjacent one another approximately in a common plane, said mating halves being adapted to couple the two conduits together, the coupling including inner and outer sealing members between mating halves, each of the mating halves including sealing means for sealing the inner pipe to the outer pipe with said sealing means including inner and outer annular rigid elongated members co-axial with said conduit, said inner annular rigid elongated member being sealably connected to said inner pipe adjacent said one end thereof and said outer annular rigid elongated member sealably connected adjacent to said one end of said outer pipe, said inner and outer annular rigid elongated members extending into said evacuated space spaced from said inner and outer pipes respectively and intersecting along an annular line between said inner and outer pipes within said evacuated space to define, in each mating half, an annular insulator space, said insulator comprising:

(a) an annular solid heat insulating member for preventing heat transfer between said inner and outer annular rigid elonagted members,
  (b) said annular solid heat insulating member being formed of heat insulating fibers bonded together with spaces between adjacent fibers to increase the heat insulating properties of the annular solid heat insulating member,
  (c) said annular solid heat insulating member conforming in shape to said annular insulator space,
  (d) said heat insulating fibers being aligned circumferentially to limit heat transfer between said annular rigid elongated members, and
  (e) a porous non-fibrous coating on said heat insulating member for allowing gases to pass through said coating and into spaces between said insulating fibers and for reducing fiber breakage in said heat insulating member and contamination of the space between said inner and outer pipes by broken fibers.

10. The insulator of claim 9 wherein said coating and said heat insulating fibers are oxygen compatible.

11. The insulator of claim 10 wherein said nonconducting fibers are fiberglass, and said coating is polytetrafluoroethylene.

References Cited
UNITED STATES PATENTS

| | | | |
|---|---|---|---|
| 2,768,925 | 10/1956 | Fay. | |
| 2,991,808 | 7/1961 | Siegmann. | |
| 3,146,005 | 8/1964 | Peyton | 285—47 |
| 3,239,245 | 3/1966 | Press | 285—112 X |
| 3,275,345 | 9/1966 | Waldron et al. | 285—47 |
| 3,280,849 | 10/1966 | Rendos et al. | 285—47 X |

FOREIGN PATENTS

| | | |
|---|---|---|
| 699,586 | 12/1964 | Canada. |
| 570,093 | 2/1933 | Germany. |
| 554,738 | 1/1957 | Italy. |

CARL W. TOMLIN, *Primary Examiner.*

THOMAS F. CALLAGHAN, *Examiner.*